(12) United States Patent
Chung

(10) Patent No.: US 12,502,032 B2
(45) Date of Patent: Dec. 23, 2025

(54) BARBECUE GRILL WITH A SMOKER

(71) Applicant: ACEWILL CORPORATION, Apia (WS)

(72) Inventor: Po-Hua Chung, Taichung (TW)

(73) Assignee: ACEWILL CORPORATION, Apia (WS)

( * ) Notice: Subject to any disclaimer, the term of this patent is extended or adjusted under 35 U.S.C. 154(b) by 404 days.

(21) Appl. No.: 18/354,798

(22) Filed: Jul. 19, 2023

(65) Prior Publication Data

US 2025/0024994 A1    Jan. 23, 2025

(51) Int. Cl.
*A47J 37/07*    (2006.01)

(52) U.S. Cl.
CPC ....... *A47J 37/0786* (2013.01); *A47J 37/0704* (2013.01)

(58) Field of Classification Search
CPC .......................... A47J 37/0704; A47J 37/0786
See application file for complete search history.

(56) References Cited

U.S. PATENT DOCUMENTS

| | | | | |
|---|---|---|---|---|
| 4,665,891 A | * | 5/1987 | Nemec | A23B 4/052 126/25 R |
| 5,195,423 A | * | 3/1993 | Beller | A47J 37/0704 99/450 |
| 6,820,538 B2 | * | 11/2004 | Roescher | A23B 4/052 99/450 |
| 2006/0249036 A1 | * | 11/2006 | Liu | A47J 37/1271 99/511 |
| 2018/0235401 A1 | * | 8/2018 | Johnston | A47J 37/0786 |

* cited by examiner

*Primary Examiner* — Alfred Basichas
(74) *Attorney, Agent, or Firm* — Best & Flanagan LLP

(57) ABSTRACT

A barbecue grill has a stand, a grill body, a smoker, and a side board. The smoker is mounted on a side of the stand, communicates with the grill body, and has a smoker body, a smoker cap, an inner box, a smoker grid, and an ash plate. The smoker body has multiple ventilation holes defined through two opposite sides of the smoker body. The smoker cap is pivotally connected to the smoker body to close a top opening of the smoker body. The inner box is mounted in the smoker body and has multiple through holes defined in the inner box and a netted bottom. The smoker grid is mounted on a top of the inner box. The ash plate is slidably mounted on a bottom of the inner box and has multiple ventilation holes selectively aligned with the ventilation holes in the smoker body.

13 Claims, 7 Drawing Sheets

BARBECUE GRILL WITH A SMOKER

FIELD OF INVENTION

The present invention relates to a barbecue grill, particularly to a barbecue grill having a smoker.

BACKGROUND OF THE INVENTION

A barbecue grill is applied to barbecue foods and is very popular in the world. A conventional barbecue grill substantially comprises a stand, a grill body, and two side boards. The grill body is mounted on a top of the stand and substantially comprises a charcoal container, a cap, and a wire grid. The charcoal container is attached to the top of the stand and is applied to hold fired charcoals inside. The cap is pivotally connected to a top of the charcoal container to close a top opening of the charcoal container. The wire grid is attached to a top of the charcoal container for holding foods, such as meats or vegetables on the wire grid. The side boards are mounted on the top of the stand and are respectively at two sides of the charcoal container to allow a user to hold or cut foods on the side boards.

However, the conventional barbecue grill can only be applied to barbecue foods and cannot be applied to smoke food, so the conventional barbecues grill is not versatile in use.

However, moisture exists during the forming process of the tubular plastic film. If the moisture cannot be effectively exhausted, the tubular plastic film may be broken and the quality and yield of forming the plastic bags will be reduced.

SUMMARY OF THE INVENTION

The objective of the present invention is to provide a barbecues grill with a smoker, so that the barbecue grill can also be applied to smoke foods and is versatile in use.

To achieve the objective, the present invention provides a barbecue grill has a stand, a grill body, a smoker, and a side board. The grill body is mounted on a top of the stand and has a charcoal container, a grill cap, and a wire grid. The charcoal container is attached to the top of the stand. The grill cap is pivotally connected to a top of the charcoal container to close a top opening of the charcoal container and has a chimney attached to a top of the grill cap and communicating with an inside space of the grill cap. The wire grid is attached to the top of the charcoal container. The smoker is mounted on a side of the stand, is attached to a side of the charcoal container, communicates with the charcoal container, and has a smoker body, a smoker cap, an inner box, a smoker grid, and an ash plate. The smoker body is hollow, is connected to the stand, is attached to the side of the charcoal container, communicates with the charcoal container, and has multiple ventilation holes defined through two opposite sides of the smoker body. The smoker cap is pivotally connected to the smoker body to close a top opening of the smoker body. The inner box is mounted in the smoker body and has multiple through holes defined in the inner box and a netted bottom. The smoker grid is mounted on a top of the inner box. The ash plate is slidably mounted on a bottom of the inner box and has multiple ventilation holes selectively aligned with the ventilation holes in the smoker body. The side board is mounted on a side of the stand opposite the smoker.

Wherein, the smoker body comprises a front board, a rear board and two side boards connected between the front board and the rear board;
a rear extension board is formed on and extends from a top of the rear board;
two side extension boards are formed on and extend from tops of the side boards respectively;
the ventilation holes in the smoker body are formed through the front board and the rear board; and
the ventilation holes in each one of the front board and the rear board are arranged in a line and are separated spaced from each other.

Wherein, two rails are mounted respectively on bottoms of the front board and the rear board at positions corresponding to the ventilation holes in the front board and the rear board, and the ash plate is mounted slidably on the rails.

Wherein, the ash plate has two side walls formed respectively on two sides of the ash plate, and each side wall has multiple of the ventilation holes formed in the side wall, arranged in a line, spaced from each other, and selectively aligning with the ventilation holes in the front board or the rear board of the smoker body.

Wherein, the two side extension boards are semicircular in shape.

Wherein, one of the side extension boards which attached to the charcoal container has a smoke hole defined through the side extension board.

Wherein, an auxiliary board is attached to a front of the charcoal container.

DETAILED DESCRIPTION OF THE PREFERRED EMBODIMENTS

Figure 1:
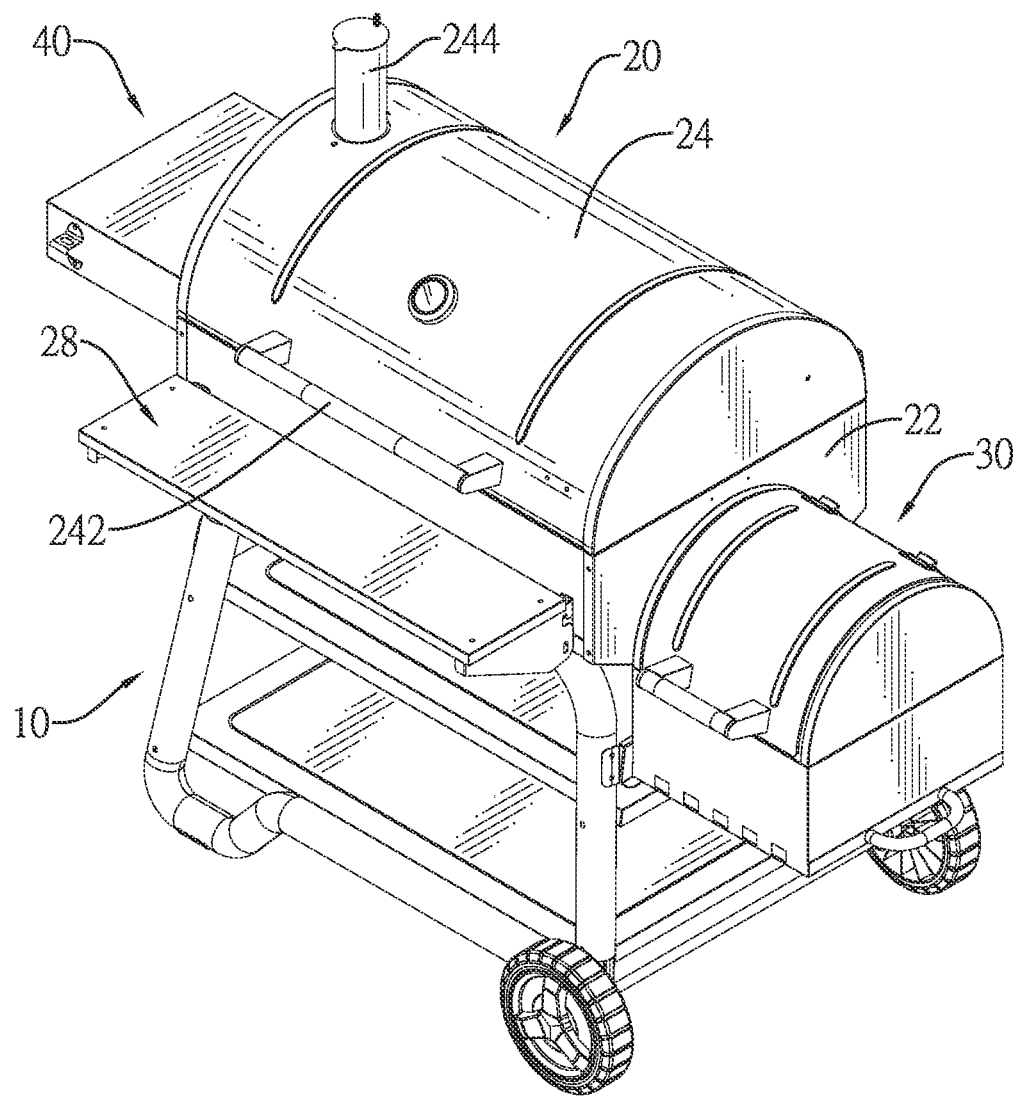
FIG. 1 is a perspective view of a barbecue grill in accordance with the present invention.
Figure 2:
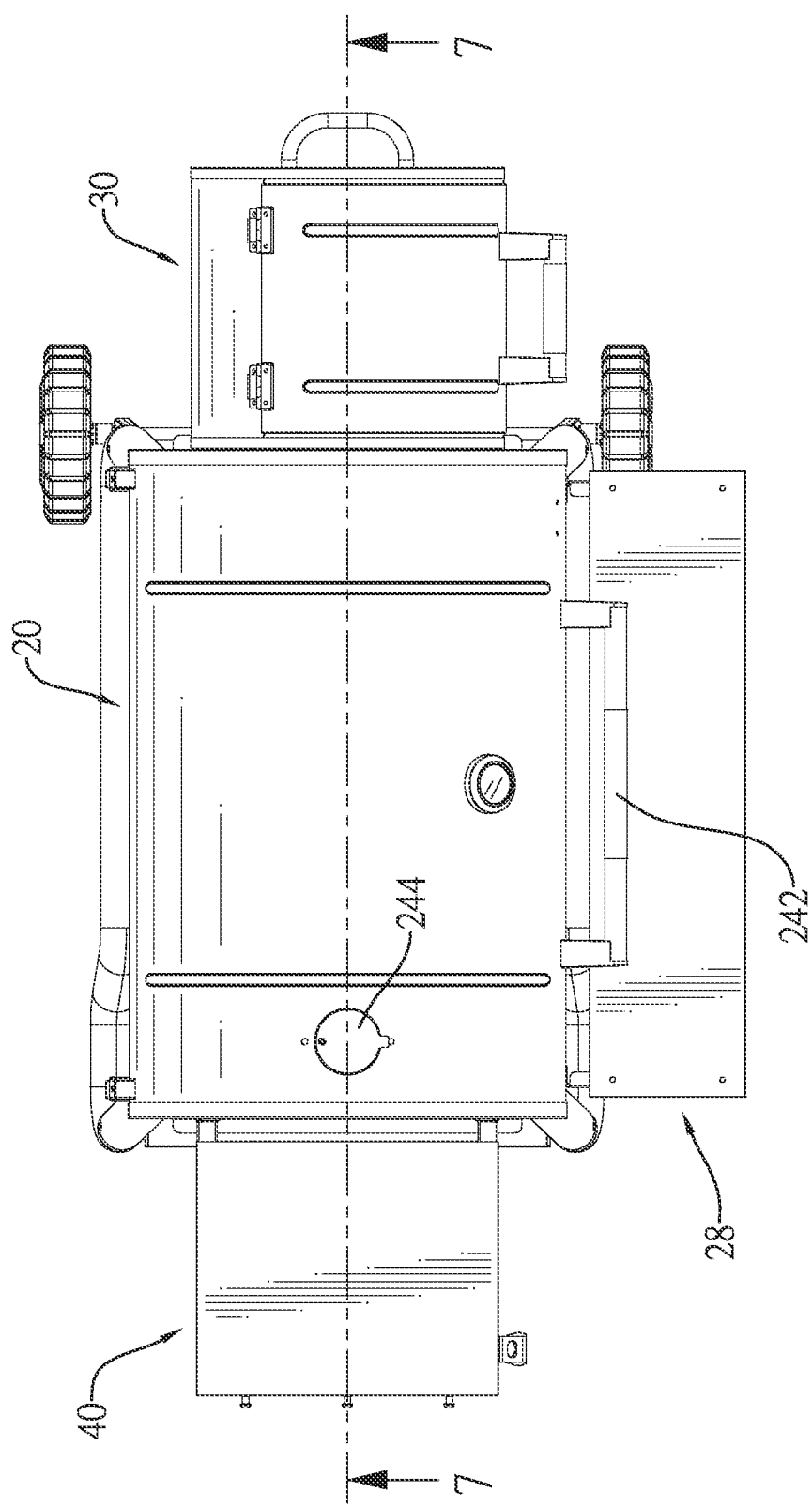
FIG. 2 is a top view of the barbecue grill in FIG. 1.
Figure 7:
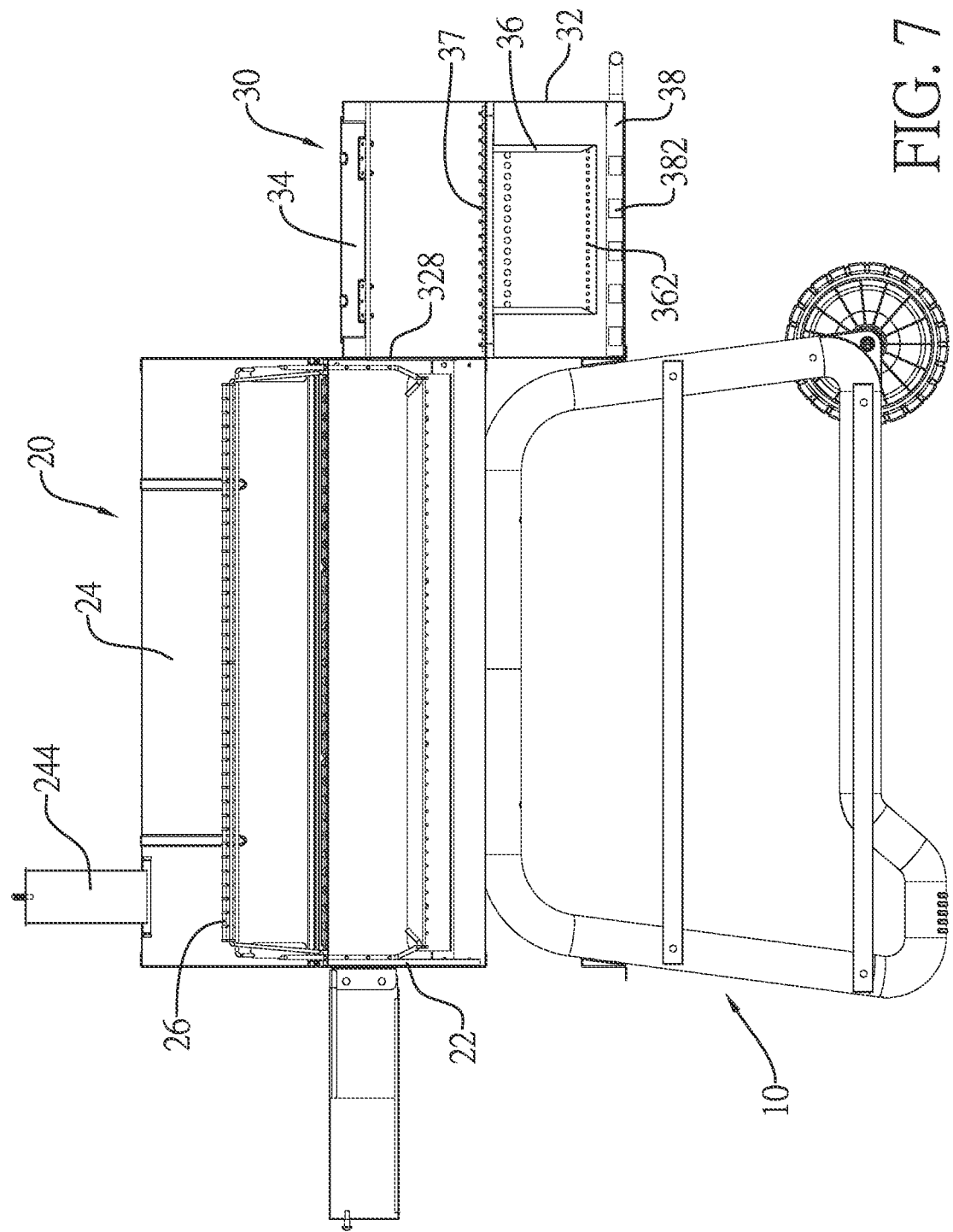
FIG. 7 is a cross sectional side view of the barbecues grill along the line 7-7 FIG. 2.

The present invention is related to a barbecue grill, with reference to FIG. 1, FIG. 2, and FIG. 7, the barbecue grill in accordance with the present invention comprises a stand 10, a grill body 20, a smoker 30, and a side board 40. The grill body 20 is mounted on a top of the stand 10 and comprises a charcoal container 22, a grill cap 24, a wire grid 26, and an auxiliary board 28. The charcoal container 22 is attached to the top of the stand 10 and is applied to hold fired charcoals inside. The grill cap 24 is pivotally connected to a top of the charcoal container 22 to close a top opening of the charcoal container 22. A handle 242 is attached to a front side of the grill cap 24, and a chimney 244 is attached to the top of the grill cap 24 and communicates with the inside space of the grill cap 24. The wire grid 26 is attached to a top of the charcoal container 22 for holding foods, such as meats or vegetables on the wire grid 26. The smoker 30 is mounted on a side of the stand 10, and the side board 40 is mounted on a side of the stand 10 opposite the smoker 30. The auxiliary board 28 is mounted on a front of the charcoal container 22.

Figure 3:
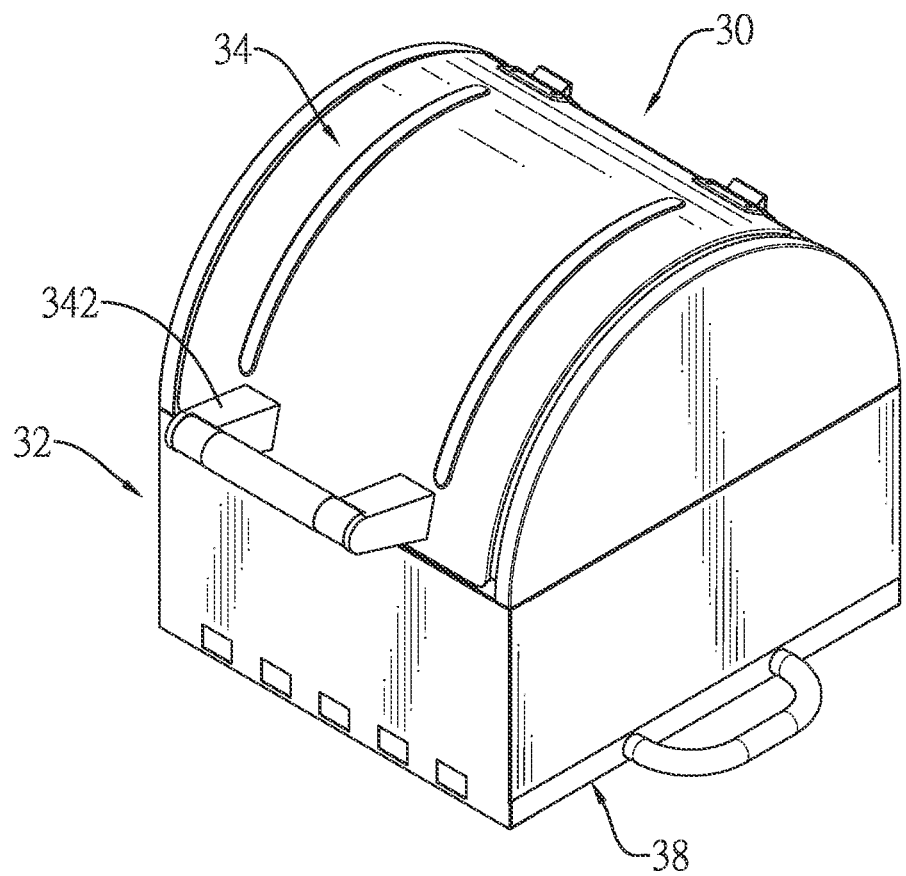
FIG. 3 is an enlarged perspective view of a smoker of the barbecue grill in FIG. 1.
Figure 4:
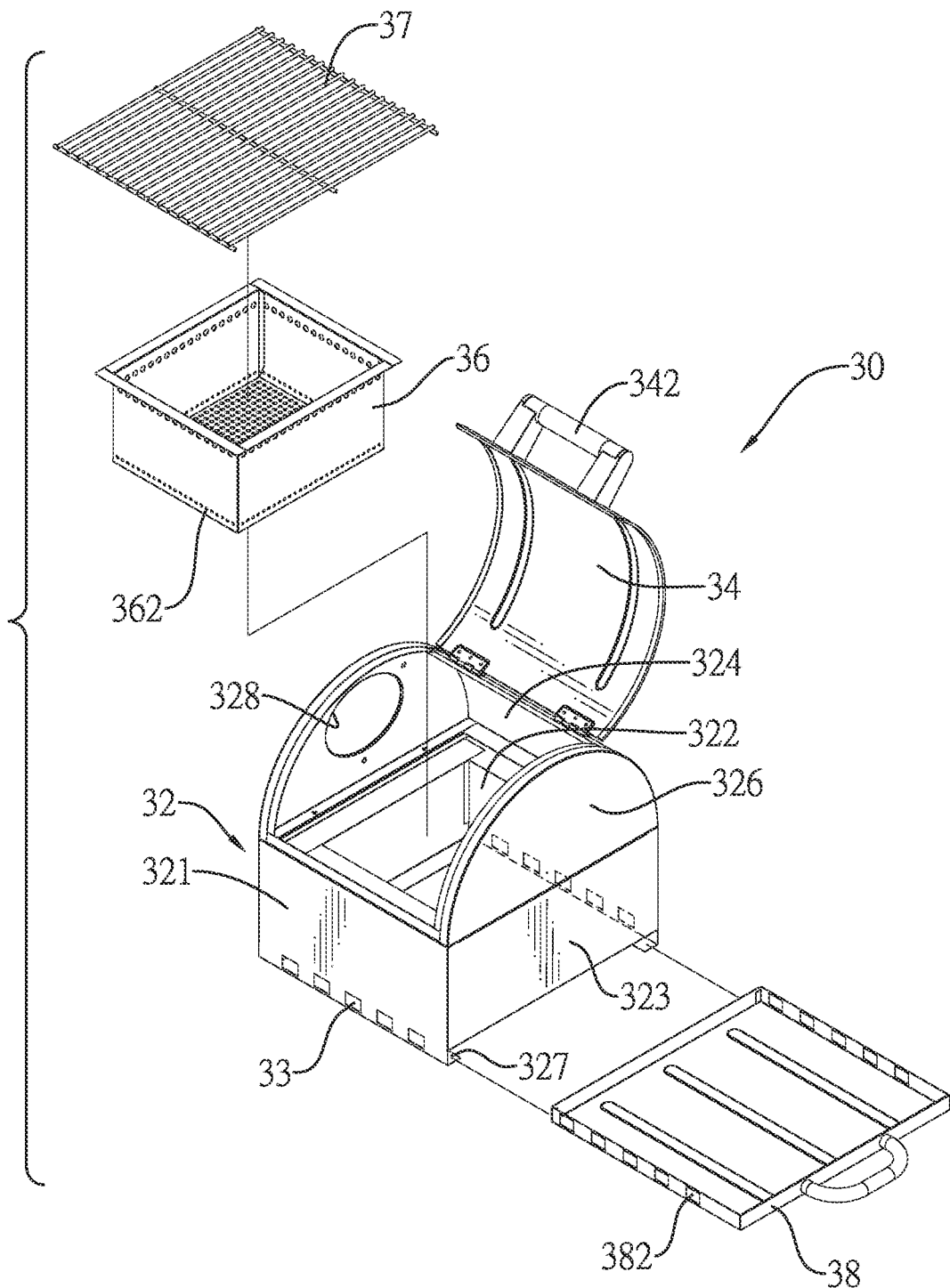
FIG. 4 is an exploded perspective view of the smoker in FIG. 3.

With reference to FIGS. 2 to 4, the smoker 30 is also attached to a side of the charcoal container 22 and comprises a smoker body 32, a smoker cap 34, an inner box 36, a smoker grid 37, and an ash plate 38. The smoker body 32 is hollow, is connected to the stand 10 and is attached to the side of the charcoal container 22. The smoker body 32 may be cubic and comprises a front board 321, a rear board 322 and two side boards 323 connected between the front board 321 and the rear board 322. A rear extension board 324 is formed on and extends from a top of the rear board 322. Two side extension boards 326 are formed on and extends from tops of the side boards 323 respectively and are semicircular in shape. Accordingly, a top opening is defined between the front board 321, the rear extension board 324, and the two side extension boards 326. Multiple ventilation holes 33 are formed through the front board 321 and the rear board 322. The ventilation holes 33 in each one of the front board 321 and the rear board 322 are arranged in a line and are separated spaced from each other. Two rails 327 are mounted respectively on bottoms of the front board 321 and the rear board 322 at positions corresponding to the ventilation holes 33 in the front board 321 and the rear board 322. The smoker cap 34 is pivotally connected to the rear extension board 324 of the smoker body 32 to close the top opening of the smoker body 32 and has a smoker handle 342 mounted on a front of the smoker cap 34. The inner box 36 is mounted securely in the smoker body 32 and is spaced from the front board 321, the rear board 322 and the side boards 323. The inner box 36 is hollow for holding fired smoking material, such as woods or charcoal inside and is composed of multiple walls. Each wall of the inner box 36 has multiple through holes 362 defined through the wall of the inner box 36. Preferably, the through holes 362 in each wall of the inner box 36 are arranged as two lines, one of the line of the through holes is located near a bottom of the wall and the other line of through holes 362 is located near a top of the wall. The inner box 36 has a netted bottom to allow ashes generated by the smoking material to discharge from the inner box 36 through the netted bottom. In addition, the inner box 36 is spaced from the smoker body 32. Preferably, a box mount is disposed on each one of the front board 321, the rear board 322 and the two side boards 323, and the inner box 36 is mounted on the box mounts on the front board 321, the rear board 322 and the two side boards 323 so as to keep the inner box 36 spacing from the front board 321, the rear board 322 and the two side boards 323 of the smoker body 32.

The smoker grid 37 is attached to the top of the inner box 36 for holding smoked foods on the smoker grid 37. The ask plate 38 is mounted sildably on the bottom of the smoker body 32 and is held slidably on the rails 327 on the front board 321 and the rear board 322. The ash plate 38 has two side walls formed respectively on two sides of the ash plate 38, and each side wall has multiple ventilation holes 382 formed in the side wall, arranged in a line, spaced from each other, and selectively aligning with the ventilation holes 33 in the front board 321 or the rear board 322 of the smoker body 32.

With such an arrangement, fired smoking material, such as charcoals or woods can be put into the inner box 36, and foods, such as fishes, meats or vegetables, put on the smoker grid 36 can be barbecued or smoked. Therefore, the grill body 20 can be applied to barbecue foods, and the smoker 30 can be applied to smoke foods, so that the barbecue grill in accordance with the invention is versatile in use.

Figure 5:
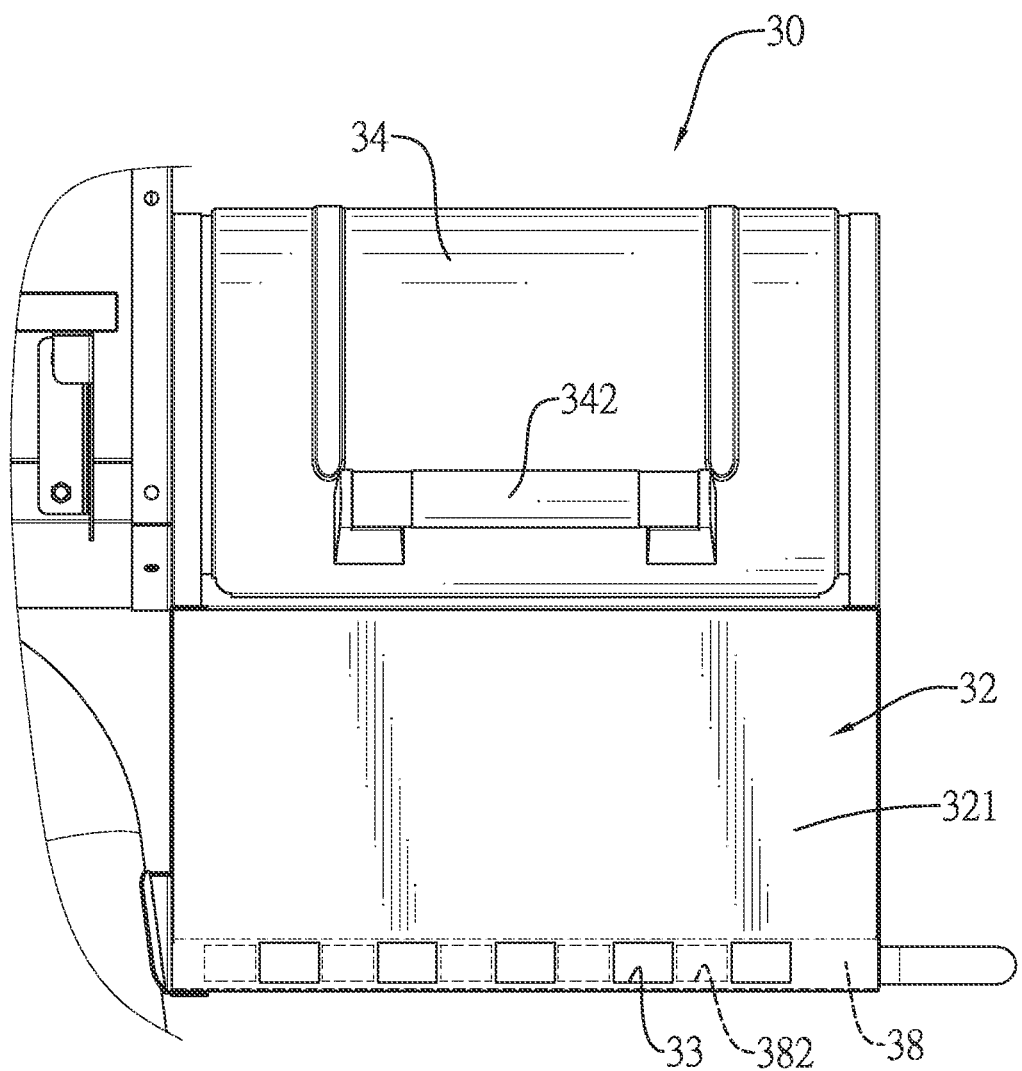
FIG. 5 is an enlarged side view of the barbecue grill to show the smoker in a closed status.
Figure 6:
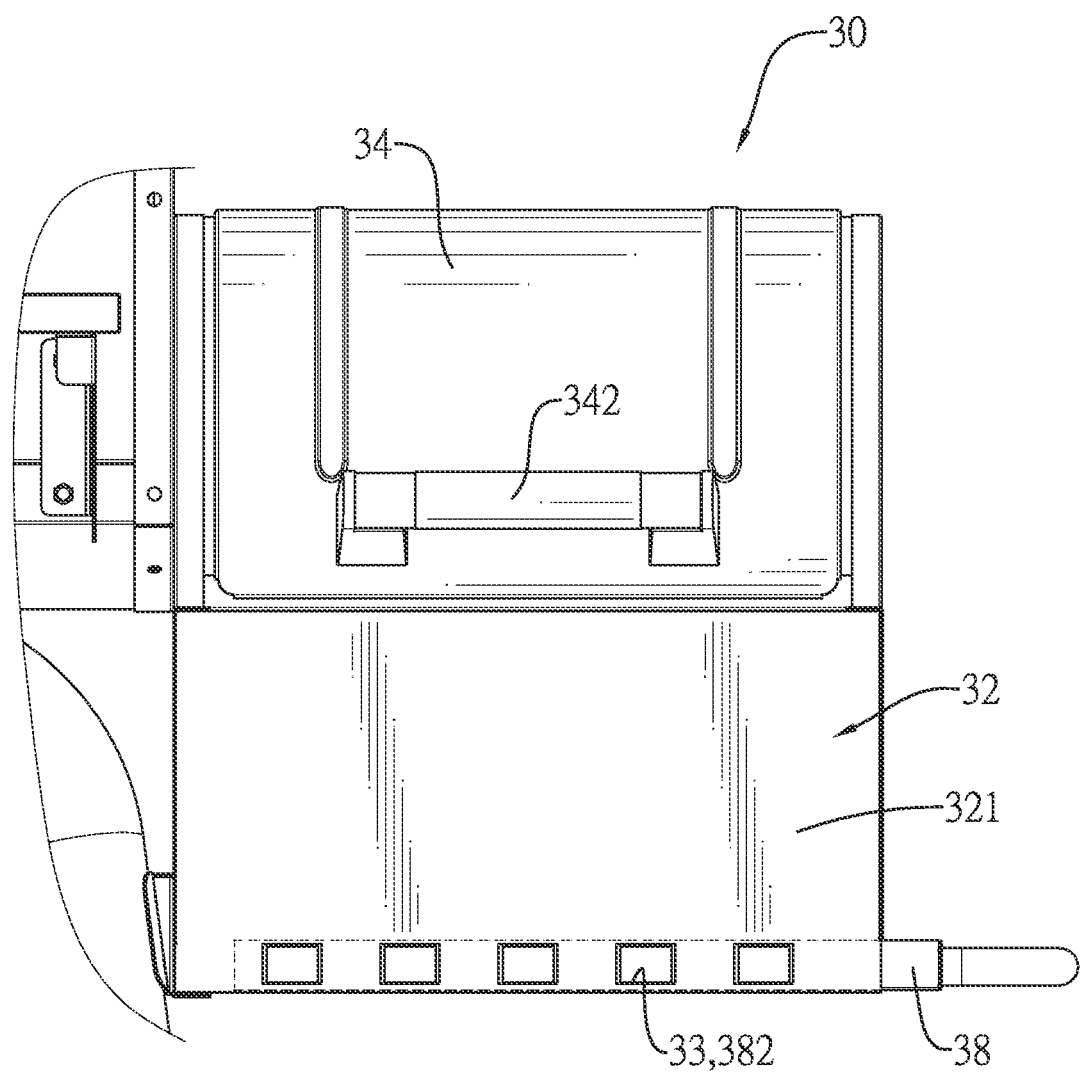
FIG. 6 is an enlarged side view of the barbecue grill to show the smoker in a ventilation status.

When the smoker cap 34 is pivoted to open the top opening of the smoker body 32, the smoker grid can be applied to barbecue foods. When the smoker cap 34 is pivoted to close the top opening of the smoker body 32, foods can be smoked by the smoke generated by the smoking material. In addition, with reference to FIGS. 4 and 5, when the ash plate 38 is moved along the rails 327 to a position where the ventilation holes 382 in the side walls of the ash plate 38 is completely misaligned with the ventilation holes 33 in the front board 321 and the rear board 322, the ventilation holes 382 in the ash plate 38 are blocked by the front board 321 and the rear board 322 of the smoker body 32 and are completely closed. At this time, the air outside the smoker body 32 is completed kept from entering the smoker body 32. Thus, the foods will be stewed by the smoke generated by the smoking material at a lower temperature. With reference to FIGS. 4 and 6, when the ash plate 38 is moved along the rails 327 to a position where the ventilation holes 382 in the side walls of the ash plate 38 are completely aligned with the ventilation holes 33 in the front board 321 and the rear board 322, respectively, the ventilation holes 328 in the ash plate 38 and the smoker body 32 are completed opened. At this time, the air outside the smoker body 32 is allow to enter the smoker body 32 and to enter the inner box 36 through the through holes 362. Thus, the foods on the smoker grid 37 will be smoked by the smoke generated by the smoking material at a higher temperature. In addition, when the ash plate 38 is moved to a position where the ventilation holes 382 in the ash plate 38 are partially aligned with the ventilations holes 33 in the smoker body 32, the air entering into the smoker body 32 can be changed. Accordingly, the fire power of the smoking material in the inner box 36 can be adjusted by moving the ash plate 38 along the rails 327. Furthermore, because the inner box 36 is spaced from the smoker body 32, air entering into the smoker body 32 can surround the inner box 36 and enter into the inner box 36 through the through holes 362 in the inner bod 36. Thus, the fire power provided by the smoking material can be enhanced. In addition, with the arrangement of two lines of the through holes 362 on each wall of the inner box 36, air can enter the inner box 36 through the through holes near the top of each wall of the inner bod. Accordingly, the air entering from the through holes 362 near the top of the walls can make the smoking material in the inner box 36 secondary combustion. Thus, the fire power of the smoking material can be further enhanced.

Furthermore, with reference to FIG. 7, the smoker body 32 can communicate with the charcoal container 22 of the grill body 20, so the smoke generated by the smoking material can flow into the charcoal container 22 and food put on the wire grid 26 can be smoked by the smoker generated by the smoking material in the inner box 36. Then, the smoke can be discharged out of the grill body 20 via the chimney 244 on the grill cap 24. In addition, a smoke hole 328 is defined through one of the side extension boards 326 which is attached to the grill body 20.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A barbecue grill comprising:
a stand;
a grill body mounted on a top of the stand and comprising;

a charcoal container attached to the top of the stand;

a grill cap pivotally connected to a top of the charcoal container to close a top opening of the charcoal container and having a chimney attached to a top of the grill cap and communicating with an inside space of the grill cap; and a wire grid attached to the top of the charcoal container;

a smoker mounted on a side of the stand, attached to a side of the charcoal container, communicating with the charcoal container, and comprising a smoker body being hollow, connected to the stand, attached to the side of the charcoal container, communicating with the charcoal container, and having multiple ventilation holes defined through two opposite sides of the smoker body;

a smoker cap pivotally connected to the smoker body to close a top opening of the smoker body;

an inner box mounted in the smoker body, spaced from the smoker body, and having a netted bottom, wherein the inner box is composed of multiple walls, each wall of the inner box has multiple through holes defined through the wall, the through holes in each wall of the inner box are arranged as two lines, one of the line of the through holes of each wall is located near a bottom of the wall and the other line of through holes is located near a top of the wall;

a smoker grid mounted on a top of the inner box; and an ash plate slidably mounted on a bottom of the inner box and having multiple ventilation holes selectively aligned with the ventilation holes in the smoker body; and a side board mounted on a side of the stand opposite the smoker.

2. The barbecue grill as claimed in claim 1, wherein the smoker body comprises a front board, a rear board and two side boards connected between the front board and the rear board;

a rear extension board is formed on and extends from a top of the rear board;

two side extension boards are formed on and extend from tops of the side boards respectively;

the ventilation holes in the smoker body are formed through the front board and the rear board; and the ventilation holes in each one of the front board and the rear board are arranged in a line and are separated spaced from each other.

3. The barbecue grill as claimed in claim 2, wherein two rails are mounted respectively on bottoms of the front board and the rear board at positions corresponding to the ventilation holes in the front board and the rear board; and the ash plate is mounted slidably on the rails.

4. The barbecue grill as claimed in claim 3, wherein the ash plate has two side walls formed respectively on two sides of the ash plate, and each side wall has multiple of the ventilation holes formed in the side wall, arranged in a line, spaced from each other, and selectively aligning with the ventilation holes in the front board or the rear board of the smoker body.

5. The barbecue grill as claimed in claim 4, wherein each one of the front board, the rear board and the two side boards of the smoker body has a box mount disposed on the front board, the rear board and the side boards; and the inner box is mounted on the box mounts on the front board, the rear board and the two side boards.

6. The barbecue grill as claimed in claim 5, wherein the two side extension boards are semicircular in shape.

7. The barbecue grill as claimed in claim 6, wherein one of the side extension boards which is attached to the charcoal container has a smoke hole defined through the side extension board.

8. The barbecue grill as claimed in claim 7, wherein an auxiliary board is attached to a front of the charcoal container.

9. The barbecue grill as claimed in claim 2, wherein each one of the front board, the rear board and the two side boards of the smoker body has a box mount disposed on the front board, the rear board and the side boards; and the inner box is mounted on the box mounts on the front board, the rear board and the two side boards.

10. The barbecue grill as claimed in claim 9, wherein the two side extension boards are semicircular in shape.

11. The barbecue grill as claimed in claim 10, wherein one of the side extension boards which is attached to the charcoal container has a smoke hole defined through the side extension board.

12. The barbecue grill as claimed in claim 11, wherein an auxiliary board is attached to a front of the charcoal container.

13. The barbecue grill as claimed in claim 1, wherein an auxiliary board is attached to a front of the charcoal container.

* * * * *